(12) United States Patent
Lam

(10) Patent No.: US 12,148,454 B2
(45) Date of Patent: Nov. 19, 2024

(54) MAGNETIC RECORDING HEAD WITH STABLE MAGNETIZATION OF SHIELDS

(71) Applicant: Western Digital Technologies, Inc., San Jose, CA (US)

(72) Inventor: Quan-Chiu Harry Lam, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/142,938

(22) Filed: May 3, 2023

(65) Prior Publication Data
US 2023/0274761 A1 Aug. 31, 2023

Related U.S. Application Data

(62) Division of application No. 17/396,234, filed on Aug. 6, 2021, now Pat. No. 11,676,627.

(51) Int. Cl.
| | |
|---|---|
| G11B 5/31 | (2006.01) |
| G11B 5/11 | (2006.01) |
| G11B 5/127 | (2006.01) |
| G11B 5/187 | (2006.01) |
| G11B 5/48 | (2006.01) |

(52) U.S. Cl.
CPC ............ *G11B 5/315* (2013.01); *G11B 5/11* (2013.01); *G11B 5/1276* (2013.01); *G11B 5/187* (2013.01); *G11B 5/3153* (2013.01); *G11B 5/484* (2013.01)

(58) Field of Classification Search
None
See application file for complete search history.

(56) References Cited

U.S. PATENT DOCUMENTS 4,849,841 A 7/1989 Sokolik
5,361,547 A * 11/1994 Church ............... G11B 5/3166
(Continued)

FOREIGN PATENT DOCUMENTS

JP 2008077723 A * 4/2008 ............. G11B 5/315

OTHER PUBLICATIONS

Lim et al., "Effect of Soft Underlayer Magnetic Anisotrpy om Perpendicular Recording Process", Journal of Magnetism and Magnetic Materials, vol. 310, Issue 2, Part 3, Mar. 2007, pp. 2680-2682.

*Primary Examiner* — William J Klimowicz
(74) *Attorney, Agent, or Firm* — PATTERSON + SHERIDAN, LLP

(57) ABSTRACT

Aspects of the present disclosure generally relate to a magnetic recording head that includes a main pole, a leading shield, a first side shield disposed on a first side of the main pole, a second side shield disposed on a second side of the main pole, and a trailing shield. The trailing shield is disposed on a trailing side of the main pole. One or more approaches are disclosed to control return-fluxes. In some embodiments, at least one of the upper return pole, the leading shield, the trailing shield, the first side shield, and the second side shield includes a laminate structure having at least a pair of ferromagnetic layers, and a non-magnetic spacer layer disposed between adjacent ferromagnetic layers. In some embodiments, one or more shunts are positioned, such as connecting the leading shield to the upper return pole in order to create circuits to control magnetic flux.

20 Claims, 10 Drawing Sheets

(56) References Cited

U.S. PATENT DOCUMENTS

| | | | |
|---|---|---|---|
| 6,292,334 B1 | 9/2001 | Koike et al. | |
| 6,437,949 B1 | 8/2002 | Macken et al. | |
| 6,807,031 B2 | 10/2004 | Macken et al. | |
| 6,842,313 B1 | 1/2005 | Mallary | |
| 7,106,554 B2 | 9/2006 | Guan et al. | |
| 7,295,401 B2 | 11/2007 | Jayasekara et al. | |
| 7,394,620 B2 | 7/2008 | Taguchi | |
| 7,561,379 B2 | 7/2009 | Li et al. | |
| 8,730,617 B1 * | 5/2014 | Hsiao | G11B 5/1278 360/125.3 |
| 8,848,316 B2 | 9/2014 | Kief et al. | |
| 9,013,836 B1 | 4/2015 | Liu et al. | |
| 9,123,359 B1 | 9/2015 | Han et al. | |
| 9,142,227 B1 | 9/2015 | Etoh et al. | |
| 9,805,745 B1 | 10/2017 | Takagishi et al. | |
| 11,869,548 B1 * | 1/2024 | Asif Bashir | G11B 5/3116 |
| 2003/0021050 A1 | 1/2003 | Lam | |
| 2005/0068671 A1 | 3/2005 | Hsu et al. | |
| 2005/0141137 A1 * | 6/2005 | Okada | G11B 5/11 |
| 2005/0280935 A1 * | 12/2005 | Clinton | G11B 5/187 360/125.32 |
| 2008/0259498 A1 * | 10/2008 | Lengsfield | G11B 5/3116 |
| 2009/0147410 A1 * | 6/2009 | Jiang | G11B 5/1278 360/319 |
| 2013/0078483 A1 * | 3/2013 | Chen | G11B 5/315 428/815 |
| 2013/0120869 A1 * | 5/2013 | Das | G11B 5/1278 |
| 2017/0148473 A1 | 5/2017 | Wei et al. | |
| 2017/0352368 A1 * | 12/2017 | Wei | G11B 5/315 |
| 2021/0074322 A1 * | 3/2021 | Song | G11B 5/235 |
| 2023/0044051 A1 | 2/2023 | Lam | |

* cited by examiner

MAGNETIC RECORDING HEAD WITH STABLE MAGNETIZATION OF SHIELDS

CROSS-REFERENCE TO RELATED APPLICATIONS

This application is a divisional of co-pending U.S. patent application Ser. No. 17/396,234, filed Aug. 6, 2021, which is herein incorporated by reference.

BACKGROUND OF THE DISCLOSURE

Field of the Disclosure

Aspects of the present disclosure generally relate to a magnetic recording head with stable magnetization in the writer between an upper return pole and trailing shield assembly and a side shield and leading shield assembly with reduced return flux.

Description of the Related Art

Over the past few years, various magnetic recording methods have been studied to improve the areal density of a magnetic media device, such as a hard disk drive (HDD). Magnetic recording heads, or, in particular, the write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, some magnetic recording head designs use various shields around a main pole, such as side shields, leading shields, and trailing shields, to make the magnetic recording head sufficiently strong to write data to magnetic media, without disturbing the data that have already been previously written. The more recent energy assisted writers enable passing current between the main pole and the trailing shield, as well as the side-shield and leading shield assembly, to further enhance the writing ability. However, in energy assisted designs, magnetization stability is often compromised due to the modifications needed to accommodate the energy-assistance scheme, such as the insertion of a separation-gap between the trailing-shield/upper-return-pole assembly and side-shield/leading-shield assembly.

Therefore, there is a need in the art for a magnetic recording head having improved shields and enhanced control of magnetic fields.

SUMMARY OF THE DISCLOSURE

The present disclosure relates to a magnetic recording head that includes a main pole, an upper return pole, a leading shield, a first side shield disposed on a first side of the main pole, a second side shield disposed on a second side of the main pole, and a trailing shield. The trailing shield is disposed on a trailing side of the main pole. One or more approaches are disclosed to control return-fluxes. In some embodiments, at least one of the leading shield, the trailing shield, the first side shield, and the second side shield includes a laminate structure having at least a pair of magnetic layers and a non-magnetic spacer disposed between each pair of magnetic layers. In some embodiments, one or more shunts are positioned, such as connecting the leading shield to the upper return pole in order to create magnetic circuits to control magnetic flux.

In one embodiment, a magnetic recording head is provided that includes a main pole, an upper return pole, a leading shield, a first side shield disposed on a first side of the main pole, a second side shield disposed on a second side of the main pole, and a trailing shield. The trailing shield is disposed between the upper return pole and a trailing side of the main pole. A write assist element is disposed between the main pole and at least one of: the trailing shield, the leading shield, the first side shield, and the second side shield. An insulation layer is disposed between the trailing shield and at least one of the first and second side shields.

At least one of the upper return pole, the leading shield, the trailing shield, the first side shield, and the second side shield includes a laminate structure having at least a pair of magnetic layers and a non-magnetic spacer disposed between each pair of magnetic layers. In some embodiments, one or more shunts are positioned, such as connecting the leading shield to the upper return pole in order to create magnetic circuits to control magnetic flux.

In another embodiment, a magnetic recording head is provided that includes a main pole, a first side shield disposed on a first side of the main pole, a second side shield disposed on a second side of the main pole, and a trailing shield disposed on a trailing side of the main pole. The recording head further includes a leading shield disposed on a leading side of the main pole, an upper return pole disposed over the trailing shield, and a first shunt extending from the leading shield to the upper return pole.

In another embodiment, a magnetic recording head is provided including a main pole, a first side shield disposed on a first side of the main pole, and a second side shield disposed on a second side of the main pole. The magnetic recording head further includes a trailing shield disposed on a trailing side of the main pole, a leading shield disposed on a leading side of the main pole, and an upper return pole disposed over the trailing shield. The magnetic recording head further includes a lead having a first portion including copper and a second portion including a magnetically soft material. The lead is recessed from a media facing surface (MFS), and the lead is disposed adjacent the main pole recessed from the leading shield.

In another embodiment, a magnetic recording head is provided including a main pole, an upper return pole, a leading shield, a first side shield disposed on a first side of the main pole, and a second side shield disposed on a second side of the main pole. A trailing shield is disposed on a trailing side of the main pole. At least one of the upper return pole, the leading shield, and the trailing shield, comprises a laminate structure having at least a pair of magnetic layers and a non-magnetic spacer disposed between each pair of magnetic layers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
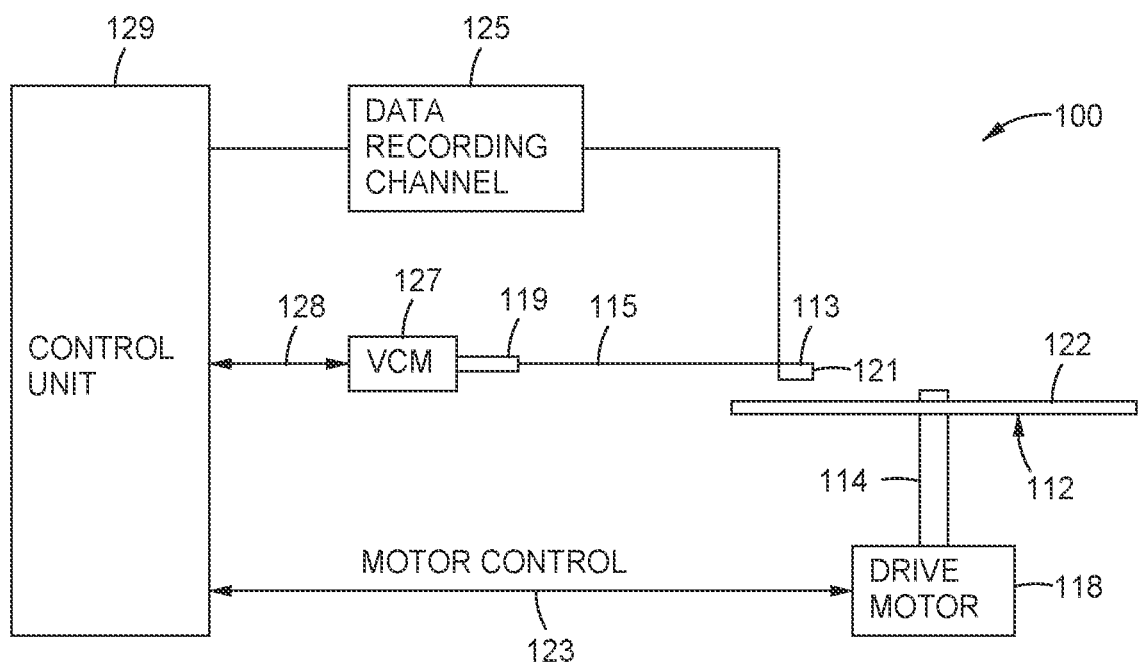
FIG. 1 illustrates a schematic view of a disk drive, according to one implementation.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to a magnetic recording head that includes a main pole, a leading shield, a first side shield disposed on a first side of the main pole, a second side shield disposed on a second side of the main pole, a trailing shield, and an upper return pole. The trailing shield is disposed on a trailing side of the main pole. A write assist element is disposed between the main pole and at least one of: the trailing shield, the leading shield, the first side shield, and the second side shield. An insulation layer is disposed between the trailing shield and at least one of the first and second side shields.

One or more approaches are disclosed to control magnetic return-fluxes from the different shields which tend to destabilize one another. In some embodiments, at least one of the upper return pole, the leading shield, the trailing shield, the first side shield, and the second side shield includes a laminate structure having at least a pair of ferromagnetic layers, and a non-magnetic spacer layer disposed between adjacent ferromagnetic layers. The laminate structure is arranged such that adjacent ferromagnetic layers are magnetically coupled in opposite directions so that the total (e.g., overall) magnetic moment of the laminated structures is substantially cancelled out or minimized. The mechanism of the magnetic coupling can be either magnetostatic coupling, or Ruderman-Kittel-Kasuya-Yosida (RKKY) coupling, which induces synthetic antiferromagnetic coupling between adjacent ferromagnetic layers via the non-magnetic spacer. In some embodiments, one or more shunts are positioned, such as connecting the leading shield to the upper return pole in order to create circuits to control magnetic flux.

It is to be understood that the embodiments discussed herein are applicable to a data storage device such as a hard disk drive (HDD) as well as a tape drive such as a tape embedded drive (TED) or an insertable tape media drive such as those made according to Linear Tape Open (LTO) standards. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

FIG. 1 illustrates a schematic view of a disk drive (e.g., magnetic recording device) 100, according to one implementation. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the magnetic recording device 100, the rotation of the magnetic media 112 generates an air bearing between the slider 113 and the media surface 122, which exerts an upward force or lift on the slider 113. The air bearing thus counter-balances the slight spring force of suspension 115 and supports slider 113 off and slightly above the media 112 surface by a small, substantially constant spacing during normal operation. In an energy-assisted magnetic recording (EAMR) head, DC or AC electric-current flows through an assist element of the magnetic head assembly 121 and enhances the write-ability so that the write element of the magnetic head assembly 121 magnetizes the data bits in the media 112.

The various components of the magnetic recording device 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
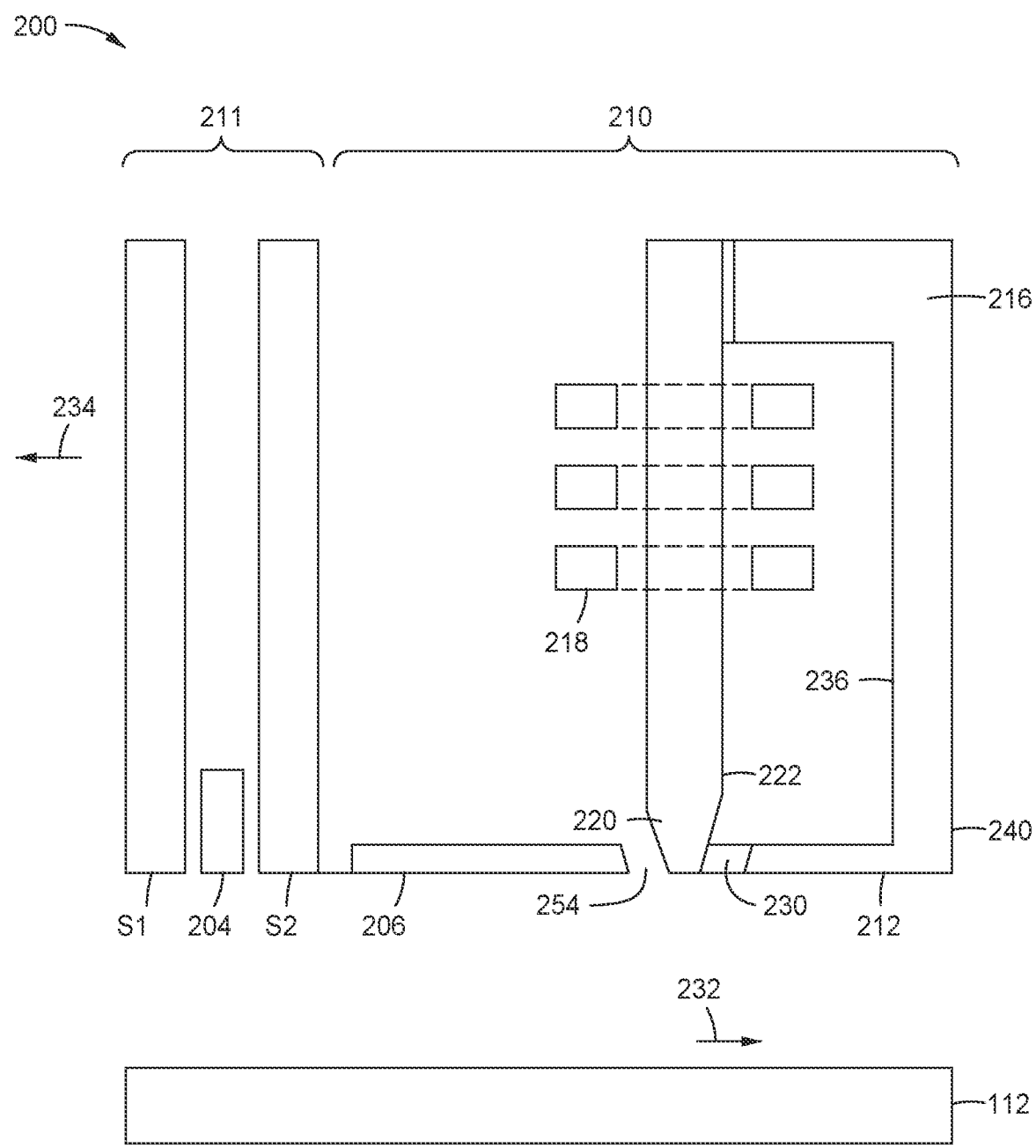
FIG. 2 is a fragmented and schematic cross-sectional side view through a center of a read/write head facing the magnetic media, according to one implementation.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a main pole 220, an upper-return pole coupled to a trailing shield 240, and a coil 218 that excites the main pole 220. The write head 210 optionally comprises a leading shield 206. The coil 218 may have a "pancake" structure which winds around a back-contact between the main pole 220 and the return pole 216, instead of a "helical" structure shown in FIG. 2. A recording magnetic field is generated from the main pole 220 and the trailing shield 240 helps making the magnetic field gradient of the main pole 220 steep. The main pole 220 may be a magnetic material such as an FeCo alloy. The main pole 220 may include a trailing surface 222, which may be parallel to a leading surface 236 of the trailing shield 240. The main pole 220 may be a tapered write pole (TWP) with a trailing edge taper (TET) configuration. The main pole 220 may comprise ferromagnetic materials, typically alloys of one or more of Co, Fe, and Ni. The read/write head 200 may be an energy-assisted magnetic recording (EAMR) head. The write assist element 230 is disposed between the main pole and at least one of: the trailing shield, the leading shield, the first side shield, and the second side shield. In one embodiment, a write assist element 230 is disposed between the trailing shield 240 and the main pole 220, and/or between the leading shield 206 and the main pole 220 (gap 254). During writing, a DC or AC electric-current flows through the assist element to enhance writing performance.

In one embodiment, the write assist element 230 may include a spin torque oscillator (STO). In other embodiments, the write assist element 230 may include a multi-layer structure including magnetic and non-magnetic materials, or a structure including non-magnetic electrically conductive material, each configured to provide assistive effect for the write operation. Examples of such a structure include those described in U.S. Pat. No. 10,366,714, titled "Magnetic write head for providing spin-torque-assisted write field enhancement," to Olson et al. and in U.S. Pat. No. 10,679,650, titled "Current-assisted magnetic recording write head with improved write gap structure" to Bai et al., both of which are assigned to assignee of the current application and hereby incorporated by reference.

FIGS. 3A, 3B, 3C, 3D, 3E illustrate media facing surface (MFS) views of magnetic recording heads 300A, 300B, 300C, 300D, 300E, respectively, according to some implementations. The magnetic recording head (e.g., 300A, 300B, 300C, 300D, 300E) may be the write head 210 of FIG. 2. The magnetic recording head 300A, 300B, 300C, 300D, 300E is within a magnetic recording device, such as the magnetic recording device 100 of FIG. 1.

The magnetic recording head 300A, 300B, 300C, 300D, 300E comprises a main pole 310 disposed between a trailing shield 312 and a leading shield 314 in the track direction. The trailing shield 312 is disposed adjacent to a first surface 310a of the main pole 310, and the leading shield 314 is disposed adjacent to a second surface 310b of the main pole 310. The first surface 310a is opposite the second surface 310b. The main pole 310 is further disposed between side shields 320a, 320b in the cross-track direction. The side shields 320a, 320b are disposed adjacent to a third surface 310c and a fourth surface 310d of the main pole 310, where the third surface 310c is opposite the fourth surface 310d. A trailing gap 316 is disposed between the first surface 310a of the main pole 310 and the trailing shield 312, and a leading gap 318 is disposed between the second surface 310b of the main pole 310 and the leading shield 314. Side gaps 322 are disposed between the third and fourth surfaces 310c, 310d of the main pole 310 and the side shields 320a, 320b. The trailing shield 312 is disposed between the trailing gap 316 and an upper return pole 313. In some embodiments, a current source (not shown) supplies alternating current (AC) or direct current (DC) to the magnetic recording head 300A, 300B, 300C, 300D, 300E.

In some embodiments, at least one of the leading shield 314, the trailing shield 312, the upper return pole 313, the first side shield 320a, and the second side shield 320b comprises a laminate structure having at least a pair of magnetic layers and a spacer disposed between each pair of magnetic layers, wherein the spacer is a non-magnetic layer. The laminate structure is arranged such that adjacent ferromagnetic layers are magnetically coupled in opposite directions so that the total (ie. overall) magnetic moment of the laminated structures is substantially cancelled out or minimized. The mechanism of the magnetic coupling can be either magnetostatic coupling, or Ruderman-Kittel-Kasuya-Yosida (RKKY) coupling, which induces synthetic antiferromagnetic coupling between adjacent ferromagnetic layers via the non-magnetic spacer. In some embodiments, the spacer layer is formed of one or more of ruthenium (Ru), chromium (Cr), iridium (Ir), rhodium (Rh), tungsten (W), molybdenum (Mo), niobium (Nb), tantalum (Ta), copper (Cu), nickel, iron, oxygen, manganese, combinations thereof, and alloys thereof. In some embodiments, the spacer layer is composed of a transition metal compound, such as a transition metal oxide. In some embodiments, one or more laminate structures includes non-magnetic materials such as nickel chromium (NiCr) as a spacer between adjacent ferromagnetic soft layers. The adjacent ferromagnetic layers align their respective magnetizations in opposing directions due to north-south pole attraction similar to two bar magnets aligned in opposing directions; ie., by magnetostatic coupling. In some other embodiments, one or more laminate structures includes materials such as chromium, ruthenium, or a combination thereof, as the spacer, to entice an additional antiferromagnetic coupling ("RKKY coupling" or "Ruderman-Kittel-Kasuya-Yosida coupling") between the two neighboring ferromagnetic layers, to ensure that the magnetization directions of the two neighboring ferromagnetic layers will be pointing in opposing directions in order to minimize the total (e.g., combined) magnetic moment. Each of the magnetic layers are composed of the same material, or different magnetic materials. In some embodiments, additional buffer layers are disposed between adjacent spacer layers and magnetic layers. Without being bound by theory, it is believed that providing buffer layers enhances material properties. The buffer layers may include any materials known in the art.

Figure 3A:
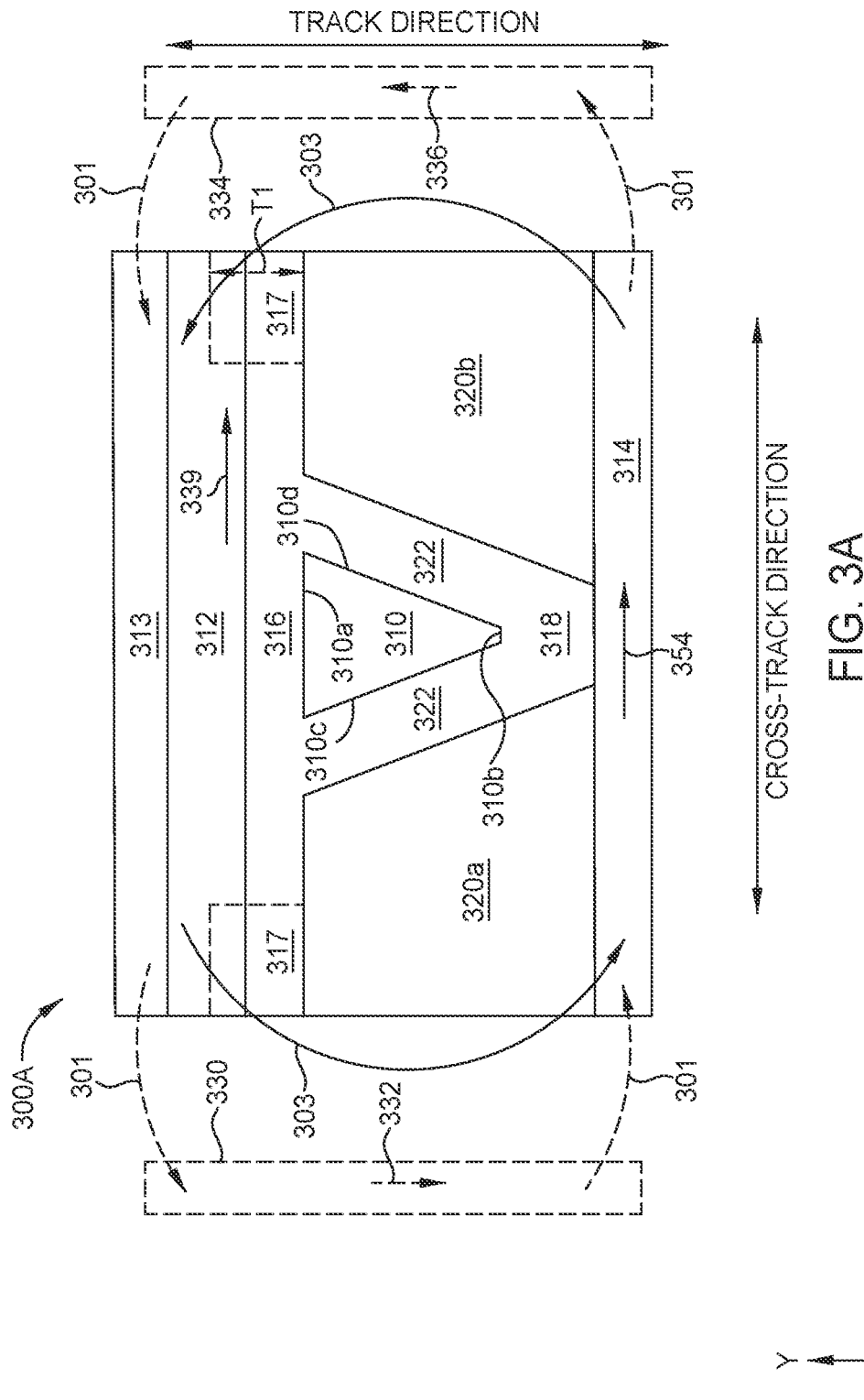
FIG. 3A depicts a media facing surface (MFS) view of a magnetic recording head without a laminate structure and having a first shunt and a second shunt, according to one implementation.

FIG. 3A depicts a magnetic recording head 300A without a laminate structure and having a first shunt 330 and a second shunt 334. Each of the first shunt 330 and the second shunt 334 is disposed at a backside of the magnetic recording head 300A, away from the media facing surface (MFS), for example, by a distance of about 500 nm or more. Each of the first shunt 330 and the second shunt 330 extend from the leading shield 314 to the upper return pole 313. The first magnetic polarity 332 of the first shunt 330 opposes the second magnetic polarity 336. Each shunt is composed of a nickel-containing material, an iron-containing material, cobalt-containing material, or a combination thereof. Each shunt is composed of NiFe, CoFe, CoFeNi, CoTaZr, CoFeTaZr, or a combination thereof. Each shunt includes trace amounts of materials such as Si, Mo, Cu, Cr, V, Al, Mn, Zn, or a combination thereof for fine-tuning of properties. Conventional magnetic recording heads without shunts and without laminate structures have shields that retain its full magnetization, and have large return-flux 303. The return-flux 303 causes destabilization of magnetizations of one or more shields, such as the magnetic polarity 339 of the trailing shield 312 which can be flipped relative to the cross-track direction in order to oppose the magnetic polarity 354 of the leading shield 314.

Without being bound by theory, it is believed that adding shunts recessed from the ABS prevents return-fluxes from one or more of the side shields 320a, 320b, leading shield 314, and trailing shield 312 from destabilizing one another near the ABS. Adding each shunt recessed from the ABS ensures magnetization stability of the trailing shield 312 and the upper return pole 313 near ABS. In particular, one or both shunts provides a return-flux path 301 from the leading shield 314 to the URP 313 recessed from the ABS, and prevents destabilizing the magnetization of the trailing shield 312.

FIG. 3A further depicts an insulation layer 317 disposed between the side shields 320a, 320b and the trailing shield 312. It has been discovered that the insulation layer 317 enables energy assisted design schemes that pass current through the write assist element 230, for example, as one located in a path between the main pole 310 and the trailing shield 312. In some design schemes, the thickness of the insulation layer 317 is about 5 nm or less or about 50 nm or more, or about 5 nm to about 50 nm, such as about 10 nm to about 30 nm. Without being bound by theory, it is believed that the insulation layer 317 also causes magnetic instability by decoupling the trailing shield and upper return pole assembly from the side shield and leading shield assembly by breaking the magnetic "exchange coupling" between the assemblies and causing magnetic rotation. By increasing a local thickness T1 at each end of the side shields 320a, 320b at a portion recessed away from the media facing surface (MFS), an efficiency of a destabilizing return flux between the leading shield 314 and side shields 320a, 320b and the trailing shield 312 and upper return pole 313 is reduced. The increased thickness T1 can range from about 10% to about 500% thicker than the insulation layer 317 thickness, such as about twice that of the thickness of the insulation layer 317 to about 300 nm. This localized increase in thickness is disposed at a location at least 500 nm recessed from the MFS, to avoid introducing additional stray fields at the MFS. In some embodiments, by increasing the local thickness of the insulation layer 317 deep recessed from the MFS, stray-fields at the MFS are not worsened. Although increasing the local thickness T1 is depicted with shunts 330, 334 and without shields having laminate structures, other embodiments are also contemplated such as increased local thickness T1 without shunts 330, 334 and/or with one or more shields having a laminate structure (e.g., a side shields 320a, 320b, leading shield 314, trailing shield 312, URP 313). Moreover, embodiments having laminate structures and without increased local thickness T1 of the insulation layer 317 are also contemplated.

Although the shunts 330, 334 are depicted in FIG. 3A, without laminate structures, other embodiments are also contemplated such as including shunts 330, 334 with one or more shields having a laminate structure (e.g., a side shields 320a, 320b, leading shield 314, trailing shield 312, upper return pole 313). Moreover, embodiments having laminate structures and without including shunts 330, 334 are also contemplated. Additionally embodiments including only a single shunt (e.g., first shunt 330 or second shunt 334) is also contemplated.

Figure 3B:
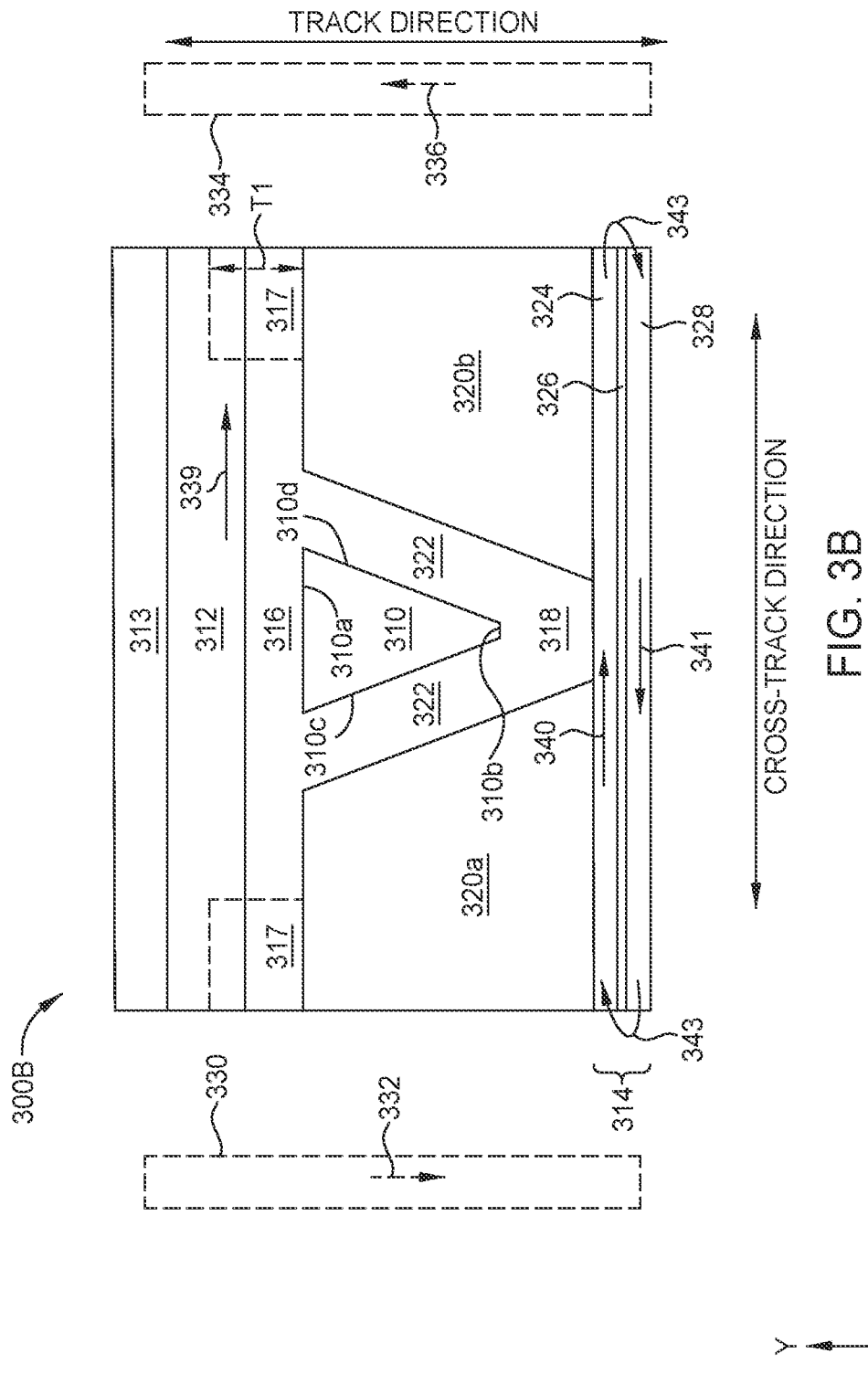
FIG. 3B depicts a media facing surface (MFS) view of a magnetic recording head having a leading shield with a laminate structure, according to one implementation.

FIG. 3B depicts a magnetic recording head 300B having a leading shield 314 with a laminate structure. The leading shield 314 includes a leading spacer layer 326 disposed between a first leading magnetic layer 324 and a second leading magnetic layer 328. In some embodiments, the leading spacer layer 326 is formed of one or more of ruthenium (Ru), chromium (Cr), iridium (Ir), rhodium (Rh), tungsten (W), molybdenum (Mo), niobium (Nb), tantalum (Ta), copper (Cu), nickel, iron, oxygen, manganese, combinations thereof, and alloys thereof, such as nickel chromium (NiCr). A thickness of the leading spacer layer 326 is about 5 Å to about 50 Å, such as about 20 Å to about 30 Å. The leading spacer layer 326 enables the first magnetic polarity 340 of the first leading magnetic layer 324 to oppose the second magnetic polarity 341 of the second leading magnetic layer 328 in the cross-track direction. A return flux 343 is provided by the opposing magnetic polarities 340, 341 to provide a flux closure within the leading shield 314. In some embodiments, the first magnetic polarity 340 is substantially the same as a trailing shield magnetic polarity 339. Without being bound by theory, it is believed that the laminate structure enables a negligible net return flux relative to leading shields having a single magnetic layer. This is in contrast to conventional magnetic recording heads which include either a single magnetic layer, or multiple but contiguous magnetic layers, as a leading shield, without a spacer. Such a design having single magnetic layer, or multiple but contiguous magnetic layers without a spacer, retains its full magnetization and its return flux is large which causes a magnetization of one or more of the trailing shield and upper return pole to switch magnetic polarity undesirably to oppose the leading shield magnetic polarity as described relative to FIG. 3A.

In some magnetic recording heads, one or more shields are made of NiFe alloys or other compositions having high magnetic permeability (e.g., magnetically soft), such as CoFe, CoFeNi, CoTaZr, CoFeTaZr, combinations thereof, or alloys thereof. Each shield can have thicknesses of about 50 nm to about 1 µm. As used herein, the terms "magnetically soft" and "high magnetic permeability" refer to materials having a ratio of magnetic induction (B) and magnetic field (H) of about 10 or larger. The ratio is dimensionless ratio measured in the centimeter-gram-second unit system.

It has been discovered that separating the leading shield into two magnetic sub-layers 324, 328, but providing a leading spacer 326 therebetween causes each sub-layer 324, 328 to oppose one another in magnetic polarity. The net return-flux of the leading shield and side shields is greatly reduced to a negligible level, allowing a more stable trailing shield 312 and upper return pole 313. This can be described as a flux closure within the laminate structure which does not destabilize the magnetization directions of surrounding shields.

Although FIG. 3B depicts a single leading spacer 326 and two sub-layers 324, 328, other number of spacers and sub-layers are contemplated, such as 2, 3, or 4 spacers, and 3, 4, or 5 sub-layers. Each of the spacers are composed of the same materials or different materials. In some embodiments, the total magnetic moment of the laminate layers pointing in the positive X direction is close to the laminate layers pointing in the negative X direction, to minimize the net magnetization of the laminate structure. In some embodiments, at least one of the magnetic sublayers in the laminate structure (e.g., 324) has a slightly larger magnetic moment than (e.g., is slightly thicker than, such as about 5% to about 10% thicker than) at least one other magnetic sublayer (e.g., 328), so that during transport of the recording head (e.g., shipping from a factory), the laminate layers can be magnetically initialized to a predetermined polarity state. As used herein, a "slight" difference in moments corresponds with sublayer thicknesses that are within about 5% to about 10% of one another. The net magnetic moment is minimized when the sublayers polarities are pointing in opposite directions.

Figure 3C:
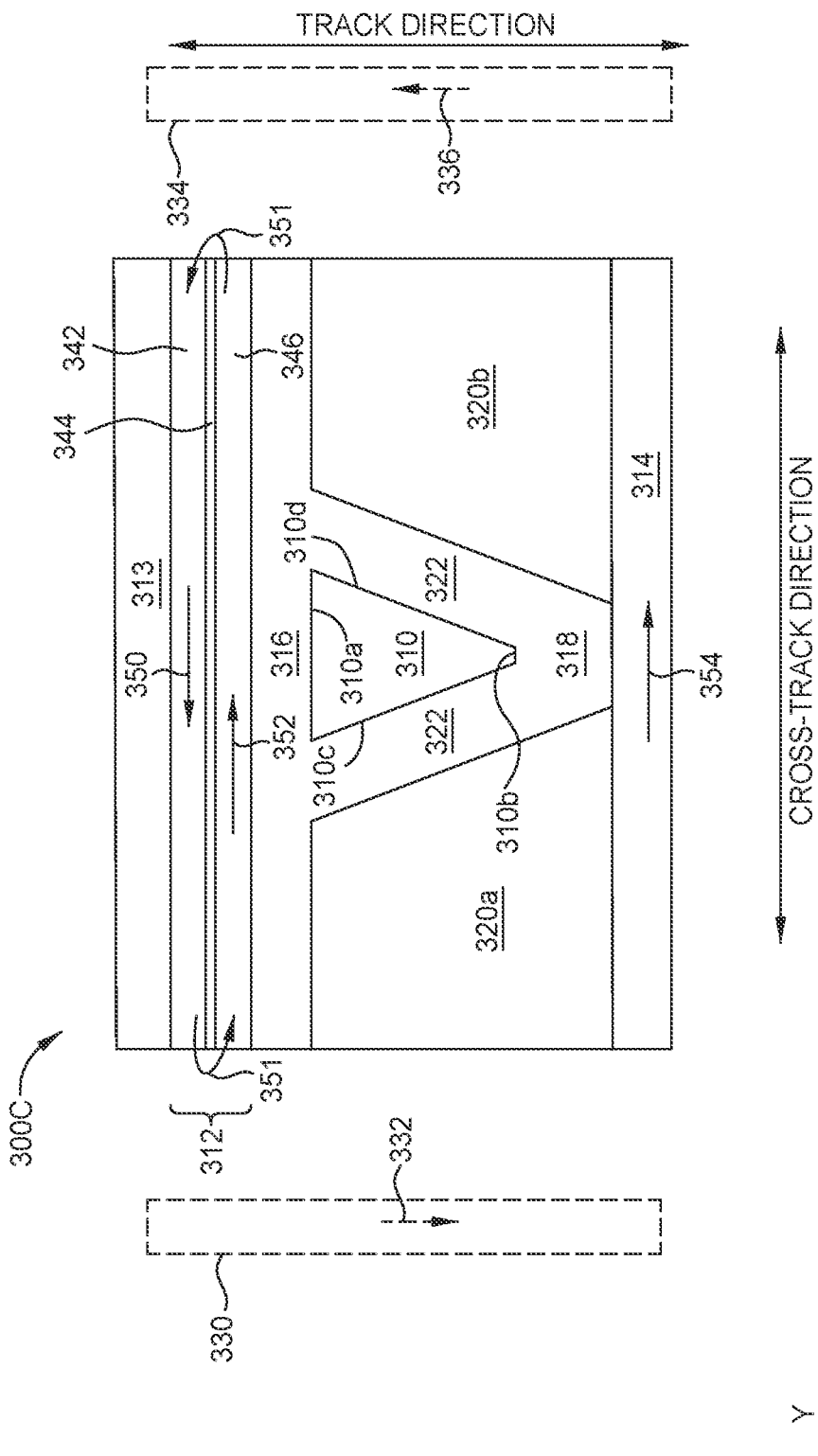
FIG. 3C depicts a media facing surface (MFS) view of a magnetic recording head having a trailing shield with a laminate structure, according to one implementation.

FIG. 3C depicts a magnetic recording head 300C having a trailing shield 312 with a laminate structure. The trailing shield 312 includes a trailing spacer layer 344 disposed between a first trailing magnetic layer 342 and a second trailing magnetic layer 346. In some embodiments, the trailing spacer layer 344 is formed of one or more of ruthenium (Ru), chromium (Cr), iridium (Ir), rhodium (Rh), tungsten (W), molybdenum (Mo), niobium (Nb), tantalum (Ta), copper (Cu), nickel, iron, oxygen, manganese, combinations thereof, and alloys thereof, such as nickel chromium (NiCr). A thickness of the trailing spacer 344 is about 5 Å to about 50 Å, such as about 20 Å to about 40 Å. Each shield can have thicknesses of about 50 nm to about 1 µm. The trailing spacer layer 344 enables the first magnetic polarity 350 of the first trailing magnetic layer 342 to oppose the second magnetic polarity 352 of the second trailing magnetic layer 346 in the cross-track direction. A return flux 351 is provided by the opposing magnetic polarities 350, 352 to provide a flux closure within the trailing shield 312. In some embodiments, the second magnetic polarity 352 is substantially the same as a leading shield magnetic polarity 354. Although shunts 330, 334 are depicted in FIG. 3C with a trailing shield 312 having a laminate structure, other embodiments are also contemplated such as including laminate structures without shunts 330, 334, or including shunts 330, 334 with one or more shields having a laminate structure (e.g., side shield 320a, side shield 320b, leading shield 314, trailing shield 312, URP 313). Additionally embodiments including only a single shunt (e.g., first shunt 330 or second shunt 334) is also contemplated alone, or in combination with one or more shields having a laminate structure. Although FIG. 3C depicts a single trailing spacer 344 and two sub-layers 342, 346, other number of spacers and sub-layers are contemplated, such as 2, 3, or 4 spacers, and 3, 4, or 5 sub-layers. Each of the spacers are composed of the same materials or different materials.

In some embodiments, the total magnetic moment of the laminate layers pointing in the positive X direction is close to the laminate layers pointing in the negative X direction, to minimize the net magnetization of the laminate structure. In some embodiments, at least one of the magnetic sublayers in the laminate structure (e.g., 346 or 342) has a slightly larger magnetic moment than (e.g., is slightly thicker than, such as about 5% to about 10% thicker than) at least one other magnetic sublayer (e.g., 342 or 346), so that during transport of the recording head (e.g., shipping from a factory), the laminate layers can be magnetically initialized to a predetermined polarity state. As used herein, a "slight" difference in moments corresponds with sublayer thicknesses that are within about 5% to about 10% of one another. The net magnetic moment is minimized when the sublayers polarities are pointing in opposite directions. In some magnetic recording heads, one or more shields are made of NiFe alloys or other compositions having high magnetic permeability (e.g., magnetic softness), such as CoFe, CoFeNi, CoTaZr, CoFeTaZr, combinations thereof, or alloys thereof.

Figure 3D:
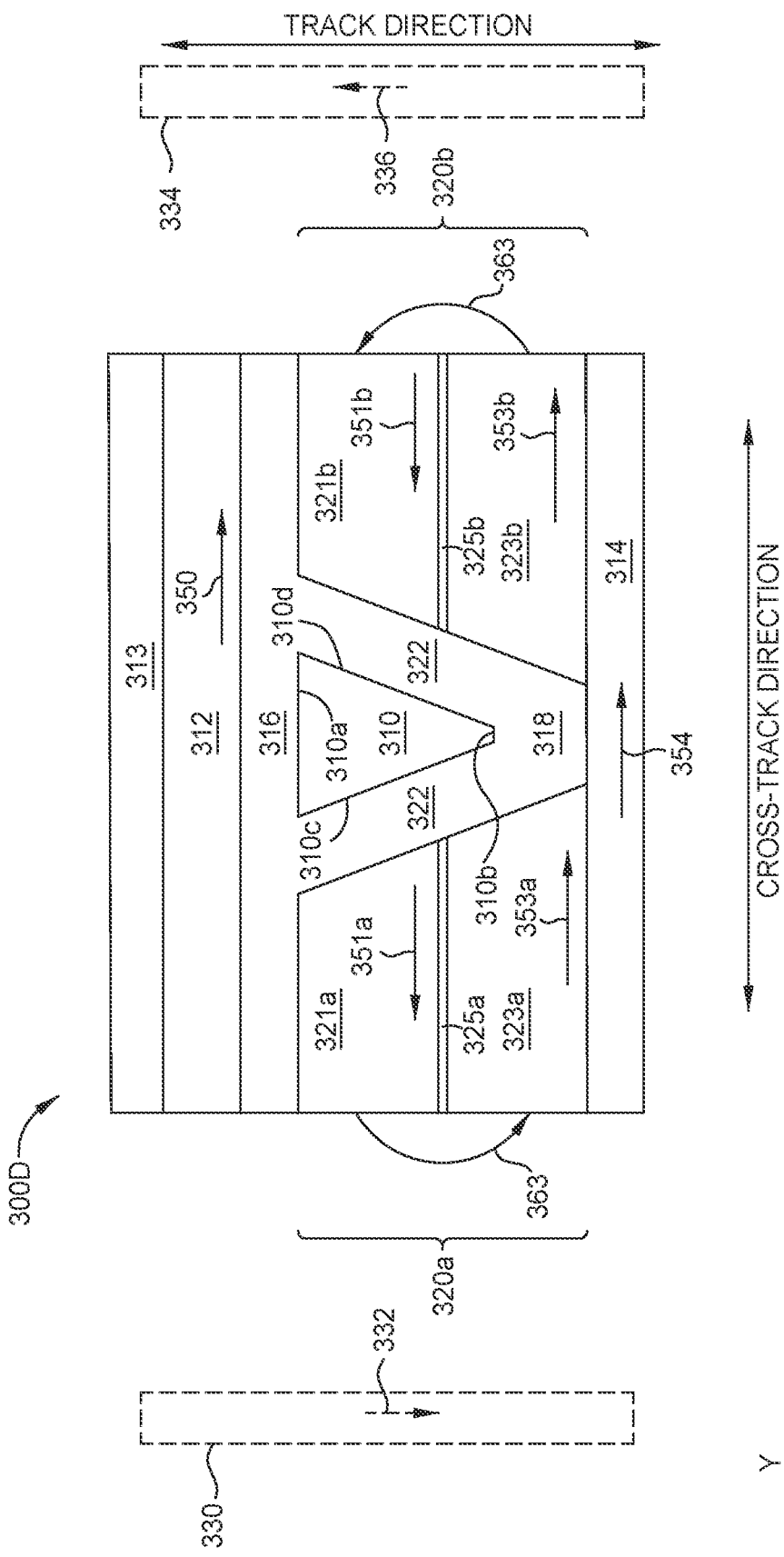
FIG. 3D depicts a media facing surface (MFS) view of a magnetic recording head having side shields with laminate structures, according to one implementation.

FIG. 3D depicts a magnetic recording head 300D having side shields 320a, 320b each with a laminate structure. Each side shield 320a, 320b includes a side spacer layer 325a, 325b disposed between a first side magnetic layer 321a, 321b and a second side magnetic layer 323a, 323b. In some embodiments, the side spacer layer 325a, 325b is formed of one or more of ruthenium (Ru), chromium (Cr), iridium (Ir), rhodium (Rh), tungsten (W), molybdenum (Mo), niobium (Nb), tantalum (Ta), copper (Cu), nickel, iron, oxygen, manganese, combinations thereof and alloys thereof, such as nickel chromium (NiCr). A thickness of the side spacer layer 325a, 325b is about 5 Å to about 50 Å, such as about 20 Å to about 40 Å. Each shield can have thicknesses of about 20 nm to about 500 nm. The side spacer layer 325a, 325b enables the first magnetic polarity 351a, 351b of the first side magnetic layer 321a, 321b to oppose the second magnetic polarity 353a, 353b of the second side magnetic layer 323a, 323b in the cross-track direction. A return flux 363 is provided by the opposing magnetic polarities 353a, 353b and 323a, 323b to provide a flux closure within the side shields. In some embodiments, the second magnetic polarity 353a, 353b is substantially the same as the leading shield magnetic polarity 354 and/or the trailing shield magnetic polarity 350.

Although FIG. 3D depicts both of the side shields 320a, 312b each having a laminate structure, other embodiments are also contemplated, such as a single side shield (e.g., 320a or 320b) having a laminate structure while the other has a single magnetic layer. Although shunts 330, 334 are depicted in FIG. 3D with side shields (320a, 320b) each having a laminate structure, other embodiments are also contemplated such as including laminate structures without shunts 330, 334, or including shunts 330, 334 with one or more shields having a laminate structure (e.g., side shield 320a, side shield 320b, leading shield 314, trailing shield 312).

Additionally embodiments including only a single shunt (e.g., first shunt 330 or second shunt 334) is also contemplated alone, or in combination with one or more shields having a laminate structure. Although FIG. 3D depicts a single side spacer (e.g., 325a, 325b) and two sub-layers (e.g., first sub-layer 321a, 323a and second sub-layer 321b, 323b), other number of spacers and sub-layers are contemplated, such as 2, 3, or 4 spacers, and 3, 4, or 5 sub-layers. Each of the spacers are composed of the same materials or different materials. A combination of aspects from each of the magnetic recording heads 300A, 300B, 300C and 300D depicted in FIGS. 3A, 3B, 3C, and 3D are contemplated, such as one or more shields all having laminate structures with or without one or more shunts 330, 334.

In some embodiments, the total magnetic moment of the laminate layers pointing in the positive X direction is close to the laminate layers pointing in the negative X direction, to minimize the net magnetization of the laminate structure. In some embodiments, at least one of the magnetic sublayers in the laminate structure (e.g., 323a, 323b or 321a, 321b) has a slightly larger magnetic moment than (e.g., is slightly thicker than, such as about 5% to about 10% thicker than) at least one other magnetic sublayer (e.g., 321a, 321b or 323a, 323b), so that during transport of the recording head (e.g., shipping from a factory), the laminate layers can be magnetically initialized to a predetermined polarity state. As used herein, a "slight" difference in moments corresponds with sublayer thicknesses that are within about 5% to about 10% of one another. The net magnetic moment is minimized when the sublayers polarities are pointing in opposite directions. In some magnetic recording heads, one or more shields are made of NiFe alloys or other compositions having high magnetic permeability (e.g., magnetic softness), such as CoFe, CoFeNi, CoTaZr, CoFeTaZr, combinations thereof, or alloys thereof.

Figure 3E:
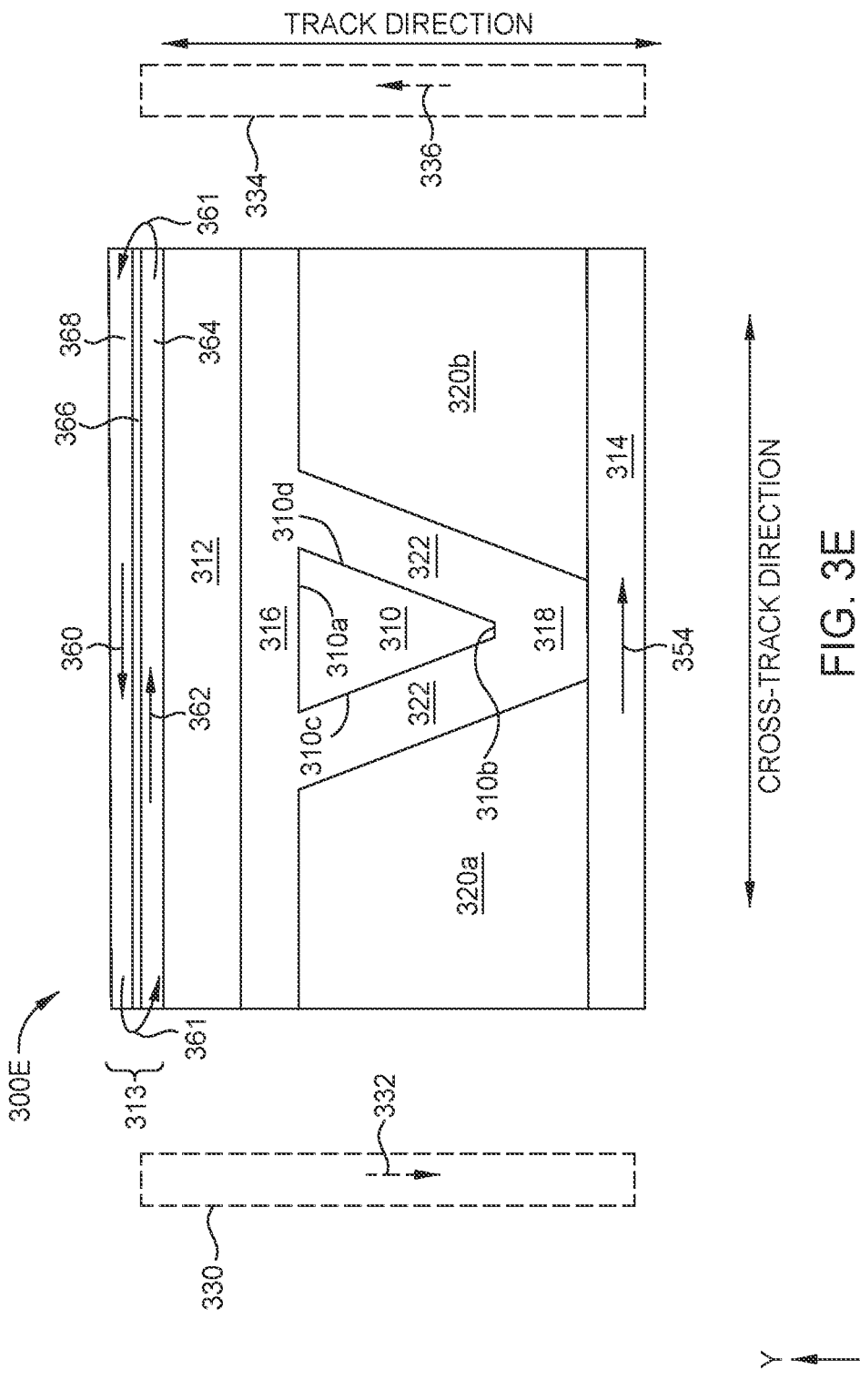
FIG. 3E depicts a media facing surface (MFS) view of a magnetic recording head having an upper return pole with a laminate structure, according to one implementation.

FIG. 3E depicts a magnetic recording head 300E having an upper return pole 313 with a laminate structure. The URP 313 includes a spacer layer 366 disposed between a first magnetic layer 368 and a second magnetic layer 364. In some embodiments, the spacer layer 366 is formed of one or more of ruthenium (Ru), chromium (Cr), iridium (Ir), rhodium (Rh), tungsten (W), molybdenum (Mo), niobium (Nb), tantalum (Ta), copper (Cu), nickel, iron, oxygen, manganese, combinations thereof and alloys thereof, such as nickel chromium (NiCr). A thickness of the spacer layer 366 is about 5 Å to about 50 Å, such as about 20 Å to about 40 Å. In some magnetic recording heads, one or more shields are made of NiFe alloys or other compositions having high magnetic permeability (e.g., magnetic softness), such as CoFe, CoFeNi, CoTaZr, CoFeTaZr, combinations thereof, or alloys thereof. Each shield can have thicknesses of about 50 nm to about 1.5 µm. The spacer layer 366 enables the first magnetic polarity 360 of the first magnetic layer 368 to oppose the second magnetic polarity 362 of the second magnetic layer 364 in the cross-track direction. A return flux 361 is provided by the opposing magnetic polarities 360, 362 to provide a flux closure within upper return pole 313.

In some embodiments, the second magnetic polarity 362 is substantially the same as the leading shield magnetic polarity 354 and/or the trailing shield 312 magnetic polarity. Although shunts 330, 334 are depicted in FIG. 3E with the URP 313 having a laminate structure, other embodiments are also contemplated such as including laminate structures without shunts 330, 334, or including shunts 330, 334 with one or more shields having a laminate structure (e.g., side shield 320a, side shield 320b, leading shield 314, trailing shield 312, URP 313). Additionally embodiments including only a single shunt (e.g., first shunt 330 or second shunt 334) is also contemplated alone, or in combination with one or more shields having a laminate structure. Although FIG. 3E depicts a single URP spacer (e.g., 366) and two sub-layers (e.g., first sub-layer 368 and second sub-layer 364), other number of spacers and sub-layers are contemplated, such as 2, 3, or 4 spacers, and 3, 4, or 5 sub-layers. Each of the spacers are composed of the same materials or different materials. A combination of aspects from each of the magnetic recording heads 300A, 300B, 300C, 300D, depicted in FIGS. 3A, 3B, 3C, 3D are contemplated, such as one or more shields all having laminate structures with or without one or more shunts 330, 334.

In some embodiments, the total magnetic moment of the laminate layers pointing in the positive X direction is close to the laminate layers pointing in the negative X direction, to minimize the net magnetization of the laminate structure. In some embodiments, at least one of the magnetic sublayers in the laminate structure (e.g., 364 or 368) has a slightly larger magnetic moment (e.g., is slightly thicker than, such as about 5% to about 10% thicker than) at least one other magnetic sublayer (e.g., 368 or 364), so that during transport of the recording head (e.g., shipping from a factory), the laminate layers can be magnetically initialized to a predetermined polarity state. As used herein, a "slight" difference in moments corresponds with sublayer thicknesses that are within about 5% to about 10% of one another. The net magnetic moment is minimized when the sublayers polarities are pointing in opposite directions.

Figure 4A:
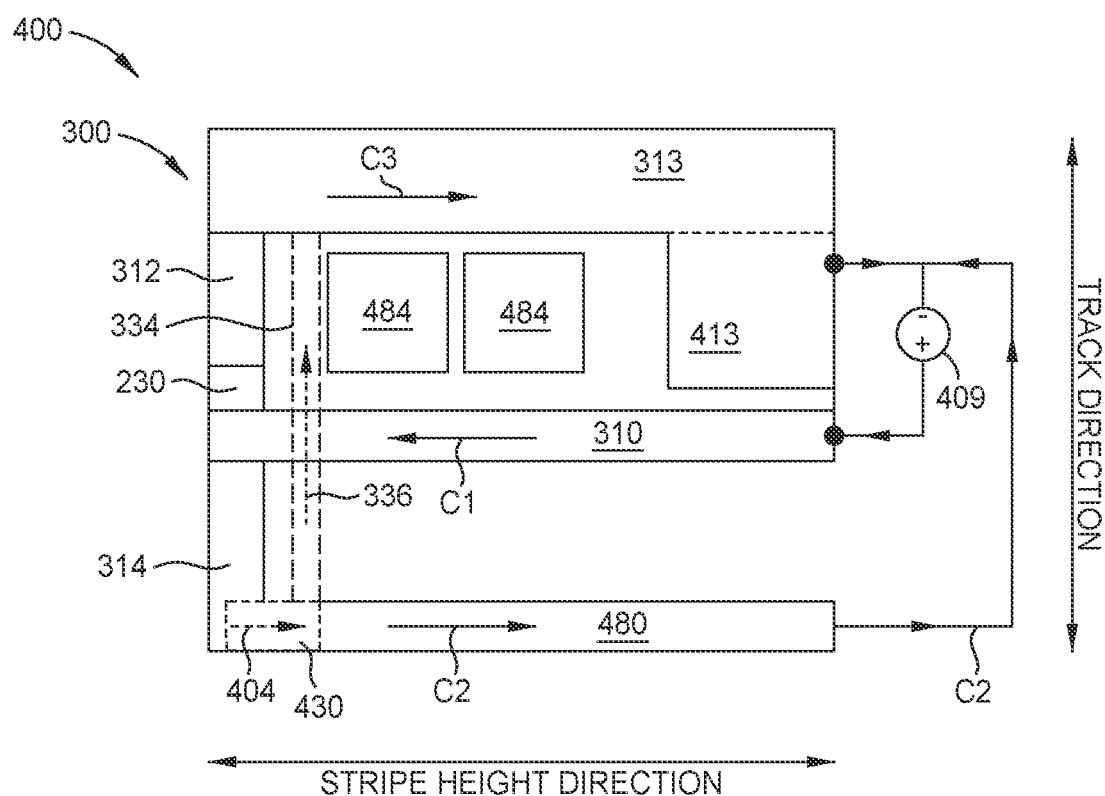
FIG. 4A depicts a schematic cross-sectional throat view of a magnetic recording head assembly, according to one implementation.

FIG. 4A is a schematic cross-sectional throat view of a magnetic recording write-head assembly, according to some embodiments. The magnetic recording head assembly 400 may be used in a magnetic recording device, such as a hard disk drive (HDD). In some embodiments, the magnetic recording head assembly 400 is used in at least part of the write head 210 in FIG. 2. The magnetic recording head assembly 400 includes a magnetic recording head 300. In some embodiments, the magnetic recording head 300 is any of the magnetic recording heads depicted in any one of FIG. 3A, 3B, 3C, 3D, or 3E. In some embodiments, a current source 409 is coupled to the main pole 310 at a terminal, and to the URP 313, as well as the leading shield 314 via a lead 480, such as a copper lead, at another terminal. The polarity (e.g., +/−designations) of the current source 409 depicted in FIGS. 4A and 4B can also be reversed in some embodiments. Although a single current source 409 is depicted, additional current sources are also contemplated. The lead 480 is part of an energy-assistance electric-current circuit. The current C1 flows through the main pole 310, through the trailing shield 312, through the upper return pole 313, shown as current C3, and returns to the current source 409. In some designs, part of the current C1 will also flow through the leading shield 314, the lead 480, shown as current C2, and return to the current source 409. In some embodiments, the upper return pole 313 includes a ledge 413 that protrudes from the upper return pole 313 and toward the main pole 310. The magnetic recording head 300 includes a coil structure 484, which is depicted as having two turns, but can have any turns from one turn to many turns. The second shunt 334 with magnet flux flow having a magnetic polarity 336 described with reference to FIG. 3A is shown along the track direction. The first shunt 330 is not shown in the view of FIG. 4A, but per FIG. 3A, it is positioned like the second shunt 334 recessed from the ABS, but placed on the other side of the main pole 310 in the cross-track direction and thus obscured in this view. In some embodiments, a third shunt (not shown), a fourth shunt 430, or a combination thereof are each disposed proximate to first shunt 330 and second shunt 334, respectively, magnetically connecting the shunts 330 and 334 to the leading shield 314, in order to shunt the magnetic flux in the leading shield 314 to the URP 313. Without being bound by theory, it is believed that in current technology a magnetic flux is routed to the leading shield 314 and its direction thereafter is not controlled, and such uncontrolled flux is a cause for writer reliability concerns, such as destabilization of the magnetic state of the trailing shield 312. Thus, providing the fourth shunt 430 and connecting the fourth shunt 430 to the second shunt 334 provides a magnetic flux flow path (e.g., having magnetic polarity 404) for the magnetic current to be routed back to the upper return pole 313 away from the MFS and other parts of the writer shields, such as the trailing shield 312. The shunts create a circuit to reroute uncontrolled flux back to the back of the magnetic recording head 300 away from the MFS and other parts of the writer shields, such as the trailing shield 312. In some embodiments, a distance from the MFS to each of the first and second shunts is about 500 nm or greater, such as about 1 μm.

Figure 4B:
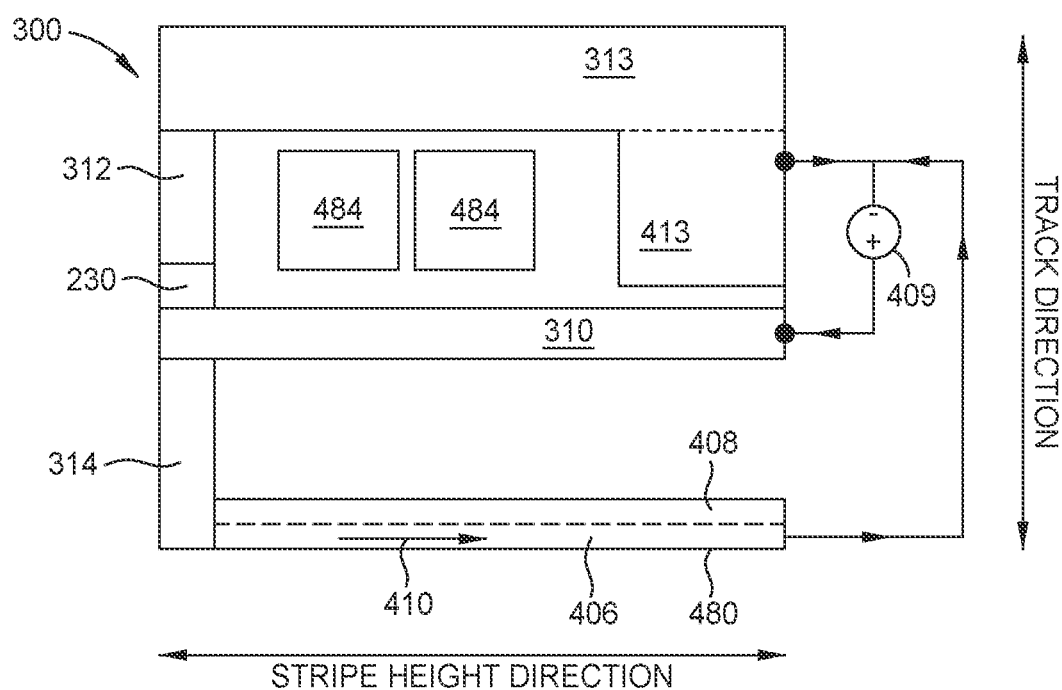
FIG. 4B depicts a schematic cross-sectional throat view of a magnetic recording head assembly, according to one implementation.

FIG. 4B is a schematic cross-sectional throat view of a magnetic recording head assembly having a lead 480, a portion of the lead 480 is composed of a soft-magnetic material 406, such as permalloy, NiFe, or other compositions having high magnetic permeability (e.g., magnetic softness), such as a magnetic permeability of about 10 or greater, such as CoFe, CoFeNi, CoTaZr, CoFeTaZr alloys. The lead 480 abuts the leading shield 314. The leading shield 314 has a dimension of about 50 nm to about 500 nm in the "stripe height direction", such as about 100 nm to about 400 nm, such as about 200 nm to about 300 nm. At least a portion of the lead 480 is composed of a low resistance material 408, such as copper, or gold. The lead 480 has a total thickness between about 500 nm and about 2 μm, such as about 1 μm. The thickness of 406 is about 25% to about 75% of the total thickness of 480. In some embodiments, the portions of the lead 480 composed of the soft-magnetic material is proximate to each of the ends (e.g., the ends in the X-direction, or cross-track direction) of the leading shield 314. The soft-magnetic material portion 406 creates a magnetic flux path having a magnetic polarity 410 to be carried to the back of the magnetic recording head assembly in the stripe height direction, where the magnetic flux will not disturb to the magnetic stability of the writer. In some embodiments, the lead 480 is composed entirely of the soft-magnetic material 406.

Figure 5:
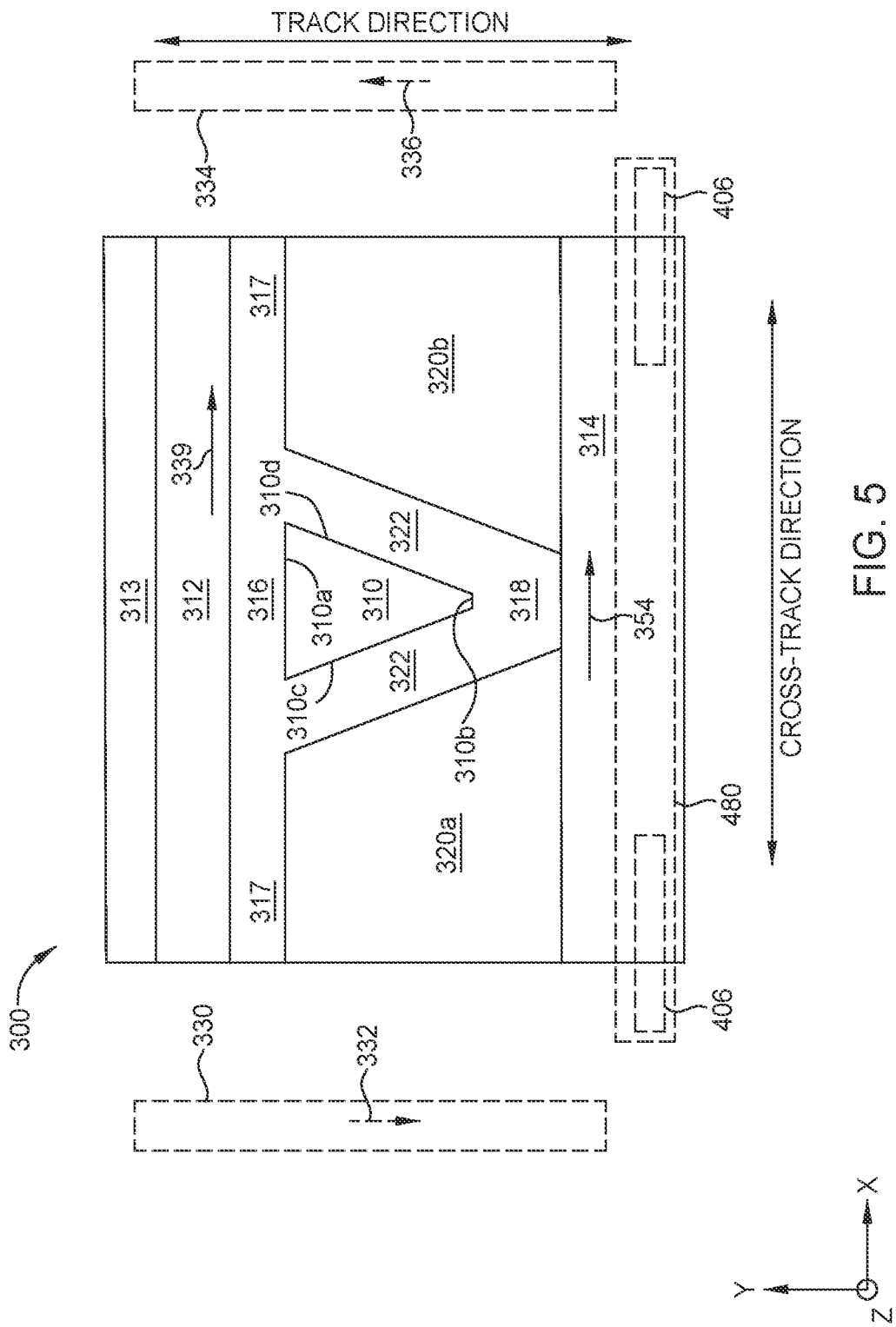
FIG. 5 depicts a magnetic recording head depicting lead recessed away from the MFS, according to one implementation.

FIG. 5 depicts a magnetic recording head 300 depicting lead 480 recessed away from the MFS. The lead 480 can extend beyond the width of the leading shield exposed at the MFS. In some embodiments, the soft-magnetic material portion 406 is disposed at least partially at the side ends of the leading shield 314.

In summation, magnetic recording heads of the present disclosure include structures having enhanced shield-stabilization, including magnetic recording heads with energy-assisted writers. Magnetization stability is achieved by controlling return flux. In particular, one or more of the upper return pole, the leading shield, trailing shield, and side shields include a laminate structure, the laminate structure creates a return flux closure within the shield to reduce a net-return flux between the upper return pole and trailing shield assembly and the side shield and leading shield assembly. In particular, a leading shield having a laminate structure prevents a trailing shield from reversing its magnetic polarity due to the presence of strong return flux from the leading shield. Alternatively, or additionally, one or more shunts are positioned between the upper return pole and the leading shield to create a magnetic flux circuit and control magnetization to reduce instability. Alternatively, or additionally, increasing local thickness of an insulation layer between the upper return pole and trailing shield assembly and the side shield and leading shield assembly at a backside of the magnetic recording head further enhances magnetic stability. Increasing the local thickness of the insulation layer will weaken the magnetostatic coupling between the two shield assemblies, mitigating the magnetization reversal of the trailing shield by the return-flux of the leading shield.

In some embodiments, a magnetic recording head comprises a main pole, an upper return pole, a leading shield, a first side shield disposed on a first side of the main pole, and a second side shield disposed on a second side of the main pole. A trailing shield is disposed on a trailing side of the main pole. A write assist element is disposed between the main pole and at least one of: the trailing shield, the leading shield, the first side shield, and the second side shield. An insulation layer is disposed between the trailing shield and at least one of the first and second side shields. At least one of the upper return pole, the leading shield, the trailing shield, the first side shield, and the second side shield comprises a laminate structure having at least a pair of magnetic layers and a non-magnetic spacer disposed between each pair of magnetic layers. In some embodiments, one or more shunts are positioned, such as connecting the leading shield to the upper return pole in order to create magnetic circuits to control magnetic flux.

The laminate structure comprises ruthenium. The upper return pole comprises the laminate structure. The trailing shield comprises the laminate structure. The leading shield comprises the laminate structure. The first side shield comprises the laminate structure. At least two magnetic layers of the laminate structure comprise opposing magnetic polarity. The trailing shield and the leading shield each comprise the laminate structure. A magnetic recording device comprising the magnetic recording head is provided.

In some embodiments, a magnetic recording head comprises a main pole, a first side shield disposed on a first side of the main pole, and a second side shield disposed on a second side of the main pole. A trailing shield is disposed on a trailing side of the main pole, and a leading shield is disposed on a leading side of the main pole. An upper return pole is disposed over the trailing shield, and a first shunt extending from the leading shield to the upper return pole.

A second shunt extends from the leading shield to the upper return pole, the first shunt is disposed adjacent to the first side shield, and the second shunt is disposed adjacent to the second side shield. The first and second shunt comprise opposing magnetic polarities. The first shunt comprises a material having a permeability ratio of magnetic induction (B) and magnetic field (H) of about 10 or larger. A lead shunt is in direct contact with and disposed coaxially with a copper lead. A bilayer lead comprises a first portion comprising copper and a second portion comprising a material selected from the group consisting of NiFe, CoFe, CoFeNi, CoTaZr, CoFeTaZr, combinations thereof, and alloys thereof. The trailing shield comprises a laminate structure comprising a magnetic layer alternating with a non-magnetic layer. A magnetic recording device comprising the magnetic recording head is provided.

In some embodiments, a magnetic recording head comprises a main pole, a first side shield disposed on a first side of the main pole, a second side shield disposed on a second side of the main pole, and a trailing shield disposed on a trailing side of the main pole. A leading shield is disposed on a leading side of the main pole, and an upper return pole is disposed over the trailing shield. A lead includes a first portion comprising copper and a second portion comprising a magnetic material having a permeability ratio of magnetic induction (B) and magnetic field (H) of about 10 or larger. The lead is recessed from a media facing surface (MFS), and the lead is disposed adjacent the main pole between the leading shield and the trailing shield.

The first portion comprising copper is closer to the trailing shield relative to the second portion of the lead. The first portion of the lead is in direct contact with a first shunt extending from the leading shield to the upper return pole. The second portion comprises a material selected from the group consisting of NiFe, CoFe, CoFeNi CoTaZr, CoFeTaZr, combinations thereof, and alloys thereof. A magnetic recording device comprising the magnetic recording head is provided.

In some embodiments, a magnetic recording head comprises a main pole, an upper return pole, a leading shield, a first side shield disposed on a first side of the main pole, and a second side shield disposed on a second side of the main pole. A trailing shield is disposed on a trailing side of the main pole. At least one of the upper return pole, the leading shield, and the trailing shield, comprises a laminate structure having at least a pair of magnetic layers and a non-magnetic spacer disposed between each pair of magnetic layers.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole;
   a first side shield disposed on a first side of the main pole;
   a second side shield disposed on a second side of the main pole;
   a trailing shield disposed on a trailing side of the main pole;
   a leading shield disposed on a leading side of the main pole;
   an upper return pole disposed over the trailing shield;
   a first shunt extending from the leading shield to the upper return pole; and
   a second shunt extending from the leading shield to the upper return pole, the first shunt and the second shunt being non-contiguous, wherein the first and second shunts are spaced from the trailing shield in a stripe height direction.

2. The magnetic recording head of claim 1, wherein the first shunt is disposed adjacent to the first side shield and the second shunt is disposed adjacent to the second side shield.

3. The magnetic recording head of claim 2, wherein the first and second shunts comprise opposing magnetic polarities.

4. The magnetic recording head of claim 1, wherein the first shunt comprises a material having a permeability ratio of magnetic induction (B) and magnetic field (H) of about 10 or larger.

5. The magnetic recording head of claim 1, further comprising a copper lead and a lead shunt, wherein the lead shunt is in direct contact with and disposed coaxially with the copper lead.

6. The magnetic recording head of claim 1, further comprising a bilayer lead, wherein the bilayer lead comprises a first portion comprising copper and a second portion comprising a material selected from the group consisting of NiFe, CoFe, CoFeNi, CoTaZr, CoFeTaZr, combinations thereof, and alloys thereof.

7. The magnetic recording head of claim 1, wherein the trailing shield comprises a laminate structure comprising a magnetic layer alternating with a non-magnetic layer.

8. A magnetic recording device comprising the magnetic recording head of claim 1.

9. A magnetic recording head, comprising:
   a main pole;
   a first side shield disposed on a first side of the main pole;
   a second side shield disposed on a second side of the main pole;
   a trailing shield disposed on a trailing side of the main pole;
   a leading shield disposed on a leading side of the main pole;
   an upper return pole disposed over the trailing shield;
   a first shunt extending from the leading shield to the upper return pole; and
   a second shunt extending from the leading shield to the upper return pole, the first shunt and the second shunt being non-contiguous, the first and second shunts each individually comprising a nickel-containing material, an iron-containing material, a cobalt-containing material, or a combination thereof, wherein the first and second shunts are spaced from the trailing shield in a stripe height direction.

10. The magnetic recording head of claim 9, wherein the first and second shunts are each individually recessed a distance of about 500 nm or more from a media facing surface.

11. The magnetic recording head of claim 9, further comprising a copper lead and a lead shunt, wherein the lead shunt is in direct contact with and disposed coaxially with the copper lead.

12. The magnetic recording head of claim 9, further comprising a bilayer lead, wherein the bilayer lead comprises a first portion comprising copper and a second portion comprising a material selected from the group consisting of NiFe, CoFe, CoFeNi, CoTaZr, CoFeTaZr, combinations thereof, and alloys thereof.

13. The magnetic recording head of claim 9, wherein the leading shield comprises a laminate structure comprising a magnetic layer alternating with a non-magnetic layer.

14. The magnetic recording head of claim 9, wherein the first and second side shields each comprise a laminate structure comprising a magnetic layer alternating with a non-magnetic layer.

15. A magnetic recording device comprising the magnetic recording head of claim 9.

16. A magnetic recording head, comprising:
   a main pole;
   a first side shield disposed on a first side of the main pole;
   a second side shield disposed on a second side of the main pole;
   a trailing shield disposed on a trailing side of the main pole;
   a leading shield disposed on a leading side of the main pole;

an upper return pole disposed over the trailing shield;
a write assist element disposed between the main pole and the trailing shield;
a first shunt extending from the leading shield to the upper return pole; and
a second shunt extending from the leading shield to the upper return pole, the first shunt and the second shunt being non-contiguous, wherein the first and second shunts are spaced from the trailing shield in a stripe height direction.

17. The magnetic recording head of claim 16, wherein the first and second shunts are each individually recessed a distance of about 500 nm or more from a media facing surface, and wherein the first and second shunts each individually comprise a nickel-containing material, an iron-containing material, a cobalt-containing material, or a combination thereof.

18. The magnetic recording head of claim 16, further comprising a copper lead and a lead shunt, wherein the lead shunt is in direct contact with and disposed coaxially with the copper lead.

19. The magnetic recording head of claim 16, further comprising a bilayer lead, wherein the bilayer lead comprises a first portion comprising copper and a second portion comprising a material selected from the group consisting of NiFe, CoFe, CoFeNi, CoTaZr, CoFeTaZr, combinations thereof, and alloys thereof.

20. A magnetic recording device comprising the magnetic recording head of claim 16.

* * * * *